No. 641,621. Patented Jan. 16, 1900.
H. AUSTIN.
AUTOMATIC TURNING MACHINE FOR SHAPING OR SHAPING AND CUTTING OFF LENGTHS OF METAL.
(Application filed Sept. 17, 1898.)
(No Model.) 2 Sheets—Sheet 1.
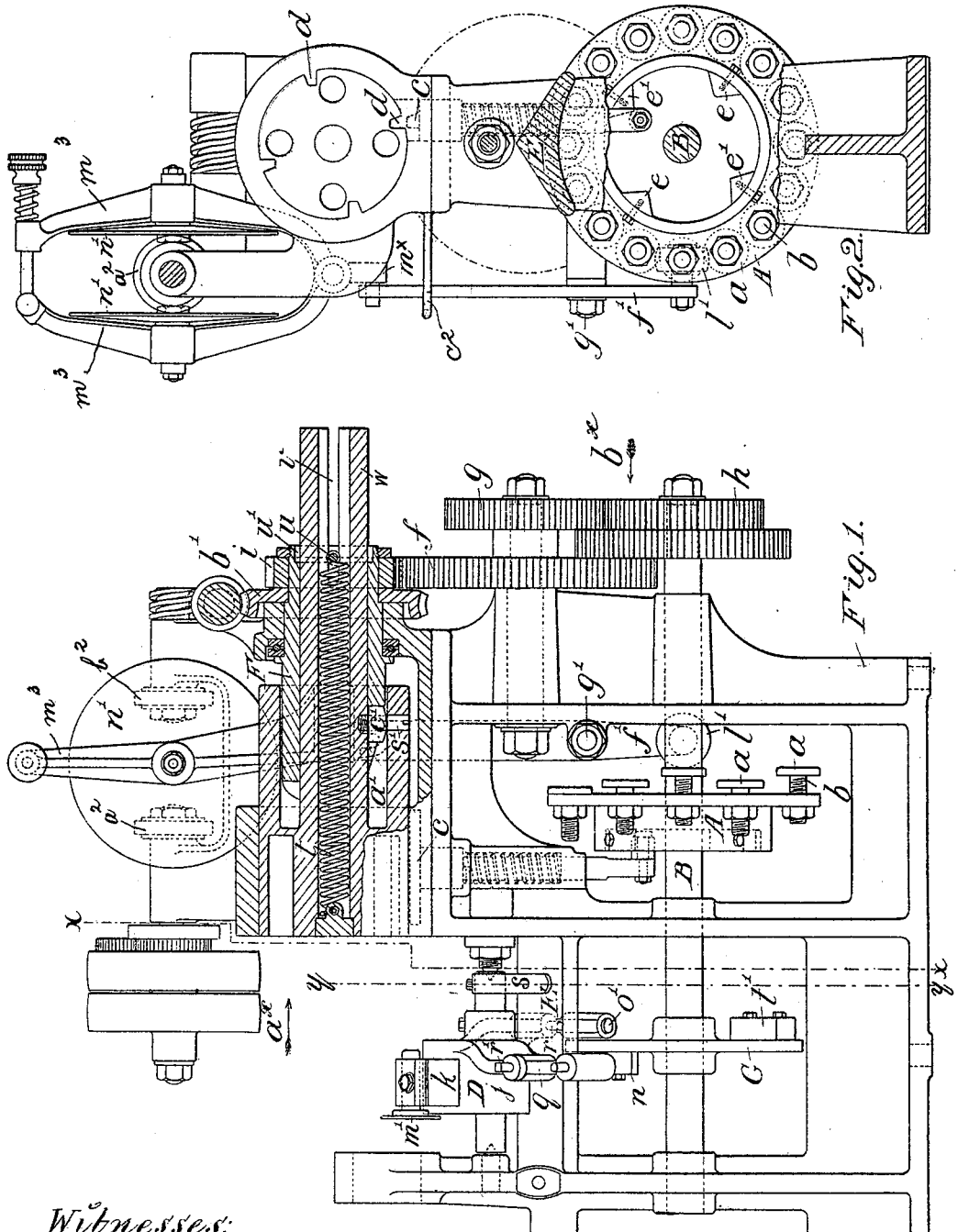

No. 641,621. Patented Jan. 16, 1900.
H. AUSTIN.
AUTOMATIC TURNING MACHINE FOR SHAPING OR SHAPING AND CUTTING OFF LENGTHS OF METAL.
(Application filed Sept. 17, 1898.)
(No Model.) 2 Sheets—Sheet 2.
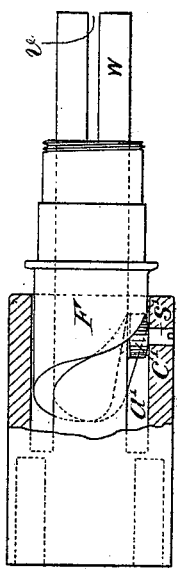
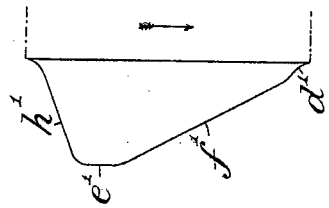
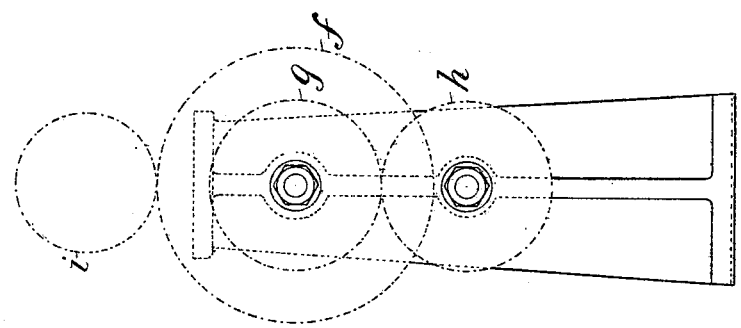
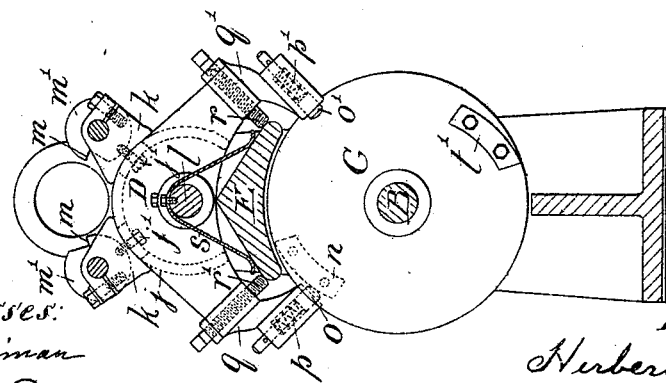

UNITED STATES PATENT OFFICE.

HERBERT AUSTIN, OF BIRMINGHAM, ENGLAND.

AUTOMATIC TURNING-MACHINE FOR SHAPING OR SHAPING AND CUTTING OFF LENGTHS OF METAL.

SPECIFICATION forming part of Letters Patent No. 641,621, dated January 16, 1900.

Application filed September 17, 1898. Serial No. 691,138. (No model.)

*To all whom it may concern:*

Be it known that I, HERBERT AUSTIN, a subject of the Queen of Great Britain, residing in the city of Birmingham, in the county of Warwick, England, have invented certain new and useful Improvements in Automatic Turning-Machines for Shaping or Shaping and Cutting Off Lengths of Metal, of which the following is a specification.

This invention relates more especially to what are known as "capstan" or "turret" lathes or machines—that is to say, to machines in which as usually employed cutting or shaping tools are carried in a capstan or turret head which is alternately advanced toward the metal to be operated upon and drawn back again to clear a tool therefrom and is partially turned between the backward and forward movement to bring another tool into position, so that when advanced it will operate upon the metal.

In describing the complete invention I will do so with particular reference to a machine of the "Spencer" type, to which its application is more particularly intended.

The invention comprises, first, improvements in the construction of the cam by means of which the speed of the machine is automatically varied to cause the speed of movement of the capstan or turret head and of the other operative parts of the machine to be varied to adapt them, respectively, for each of their respective functions; second, means for readily adapting the machine for using a less number of tools in the capstan or turret head than such head is capable of holding without unnecessary movements of the head and without unnecessary delay in the movements of the portions of the machine which control the other operations of the machine, which latter are required to be synchronous with the operations of the capstan-head; third, an improved construction of rocking pieces or bracket and tool holder or holders for sidewise cutting which avoids the inconvenience frequently experienced with sidewise-vibrating cutting mechanism of bringing the cutting tool or tools into contact with the metal to be cut in a direction which points considerably above or below its center and improved means for use in regulating the depth of cut of a sidewise-cutting tool used with these kinds of machines, and, fourth, improved combined means for reciprocating and turning the capstan or turret head which carries the tools.

In the drawings which serve to illustrate my invention, Figure 1 is a side elevation of the portion of the machine to which my improvements are applied, the capstan or turret head and the parts by which it is carried and by which it is immediately rotated and reciprocated endwise being shown chiefly in section. Fig. 2 is a transverse section taken on line $x\,x$ of Fig. 1 looking in the direction of the arrow $a^\times$, a portion of the framing being broken away to show parts thereof more clearly. Fig. 3 is a sectional view taken on line $y\,y$ of Fig. 1 looking in the opposite direction to the arrow $a^\times$. Fig. 4 is an elevation looking in the direction of the arrow $b^\times$ of the end of the framing of the machine and of a set of wheels forming a portion of change-speed gear used in varying the relative speeds of the capstan or turret head and of a shaft which controls the movements of the other operative portions of the machine. Fig. 5 is a detached view showing in side elevation the capstan or turret head and cam which rotates and moves the same endwise, with a portion of the side of the capstan-head shown as broken away to enable the shape of the operative face of the cam to be more clearly indicated; and Fig. 6 is a diagram showing the shape of such face as a side elevation of it would appear when developed.

A is the adjustable cam, by means of which the speed of the machine is automatically varied. This cam is or may be carried, as is usual, upon the cam-shaft B, and the bearing portion thereof is formed also, as usual, to present a number of separate faces, which may be moved outward or inward independently of one another. Each of these separate faces forms the outer face of a plate or head $a$, and, according to this invention, each plate or head has formed therewith a shank $b$, which projects from the middle thereof at the back. The heads are securely fixed to the main portion or disk of the cam by means of their shanks in any convenient manner which admits of their being readily adjustable endwise to adjust the heads into any position required in relation to one another. In the illustration the shanks are shown to be screwed through holes through the main portion of the cam and are locked by means of nuts on their hinder ends. In the side elevation of the cam (shown by Fig. 1) a few only of the adjustable portions are shown, the intermediate ones being omitted to avoid confusion. The variable-speed mechanism, which is operated by the cam, consists of the lever $f'$, fulcrumed at $g'$, carrying a roller $l'$, against which the bearing-faces of the cam press, and its upper end engaging with a slide $m^\times$, with which are pivotally connected the lower ends of arms $m^3$, which carry concentric disks $n'$ of the mechanism through which the motion of a roller $a^2$ is transmitted to a roller $b^2$. The movement of the lever $f'$ moves the disks $n'$ sidewise, carrying the axis of such disks farther from one of the rollers and correspondingly nearer to the other. The lever $f'$ is constantly maintained by any suitable means, such as a spring $c^2$ or weight, with the roller $l'$ against the bearing-faces of the cam. The disks $n'$ are pressed with the required pressure against the peripheries of the rollers $a^2$ $b^2$ by spring-pressure, which tends to move the arms $m^3$ toward one another, and the arms being pivotally connected with the slide $m^\times$ readily adjust themselves to equalize the pressures of the disks against the rollers.

In adapting the machine to use a less number of tools—such, for instance, as one, two, or three—in the capstan or turret head than the number—such, for instance, as two, four, or six—which such head is capable of holding without unnecessary movements of the head and without unnecessary delay in the movement of the portions of the machine which control the other operations of the machine which are required to synchronize with the operations of the capstan-head means are provided, according to this invention, in the case of a single tool only, for simply moving the capstan or turret head endwise to and fro, while it is constantly prevented from being turned, or, in the case of two or more tools, for continuously turning the capstan or turret head, so long as it is not held from turning by a locking-pin or other contrivance and for reciprocating it endwise when so held, means are provided, in the case of two or more tools, for holding out the locking-pin or other appliance used for preventing the head from turning for a sufficient length of time to prevent the turning of the head being stopped in the positions required when the omitted tools are used, and means are used also, in the case of a single tool or two or more tools, for varying the relative speeds of rotation of the parts which rotate about the axis of the capstan or turret shaft and a shaft which controls the movements of the other operative portions of the machine, so as to synchronize the movements of such other operative portions of the machine to suit the altered timing of the movements of the capstan or turret head. The means for reciprocating the capstan or turret head when held from turning and for continuously turning it when not locked from turning may consist, conveniently, of the arrangement hereinafter described for such purpose or may consist of any convenient means, such as those now in use for the purpose.

The capstan-head is provided with two or more longitudinal grooves $d$ in its outer face, as is usual, and the locking-pin $c$ may be allowed to enter each of these grooves as it comes opposite to the pin, and thus hold the head from turning as many times during one revolution as there are grooves formed therein; but when, for the purpose of this invention, it is desired to stop the turning of the head a less number of times during each complete revolution thereof than there are grooves formed in the periphery of such head, this is accomplished, according to this invention, by holding the pin out clear from one or more of the grooves as the head is turning, and this is accomplished by means of a cam or cams, such as $e$, which or each of which is of the character of the cams, such as $e'$, which are employed for drawing the bolt out of a groove in the capstan-head and is placed in position to draw back and hold back the bolt at the proper time to insure its being clear of the particular groove. If the turret-head has been carrying a certain number of tools—say four—and the revolving mechanism by which it is operated has been geared with the cam-shaft B in a manner which causes the timing of the other operative parts of the machine to synchronize properly with the movements of the capstan-head, then if the capstan-head is fitted with a less number of tools—say two—and the locking-pin is operated to stop the turning movement of the head twice during each revolution only instead of four times, as before, it will be obvious that the relative speeds of rotation of the capstan and cam shaft B must be varied to cause the movements of the other operative parts of the machine to properly synchronize with the movements of the capstan-head. This variation in speed is provided for, according to this invention, by means of a train of wheels, such as $f$ $g$ $h$, which are interchangeable, or some of which are interchangeable, with other wheels, through the medium of which the rotary movement of the revolving mechanism which operates the capstan-head is conveyed from a wheel $i$, which surrounds the axis of the capstan-head, to the cam-shaft B.

The improved rocking piece or bracket D, which acts as a tool-carrier for use in sidewise cutting, has the portion thereof $j$ to which the tool-holder $k$ or each tool-holder $k$ is fixed formed at its outer face as the portion of a cylindrical surface which is concentric with the axis $l$, upon which the rocking piece rocks. The tool-holder or each tool-holder is fixed against this cylindrical surface in a manner which allows it to be moved, circumferentially thereof, in either direction and be securely fixed in any position to which it has been moved. This is conveniently effected by forming, in respect of the tool-holder or each tool-holder, a slot through the thickness of the portion $j$ of the rocking piece, through which a pin $j'$ passes, by which the holder is fixed to the rocking piece. It will be seen that, in whichever direction a tool-holder is moved circumferentially of the cylindrical surface upon which it beds, the distance of the cutting edge $m$ of the tool $m'$ from the rocking center remains unaltered, and therefore if such position is once properly adjusted it remains so for all positions of the holder upon the rocking piece.

The rocking piece D is operated for sidewise cutting by means of a cam $n$ through the medium of a striker $o$, which communicates the pressure of the cam to the rocking piece through the medium of a spring $p$. The striker $o$ is carried by an arm $q$ of the rocking piece, which extends in a downward direction at one side of the vertical axis of the cam-spindle. An adjustable pin $r$, screwed through an arm $q'$ at the opposite side of the rocking piece to that which carries the striker $o$, by coming against a portion E of the framing of the machine forms a stop to the movement of the rocking piece which is imparted to it through the medium of such striker. The positive stop which is thus given to the movement of the rocking piece, and consequently to the sidewise cutter which has been brought into operation by such movement, avoids risk of the tool cutting in beyond the desired point, as it is liable to do when used with the ordinary mechanism by which it is operated. The arrangement by which the cam is caused to operate the rocking piece through the medium of a spring, taken in combination with the means by which the positive stop may be given to the operating movement of the rocking piece, enables fine adjustments to be made by means of the stop-pin $r$ only without altering the cam or the position of the tool, as the spring will of course yield under any extra pressure which may be brought against the striker. When, as will usually be required, two cutting-tools are carried and operated by the rocking piece D, a striker $o'$ and spring $p'$ are carried in the lower end of the arm $q'$, which extends in a downward direction similarly as the arm $q$, a stop-pin $r'$ is screwed through the arm $q$, and the striker $o'$ is operated by means of a cam $t'$, all as clearly shown by Fig. 3. The cams $n$ and $t'$ are carried on opposite faces of a rotating disk G. The arm is automatically moved back, after a cam passes out of contact with a striker, in any suitable manner, as by means of a spring $s$.

The improved combined means for reciprocating and turning the capstan or turret head comprise, according to this invention, a spring $t$, which is connected at its forward end to the capstan-head and at its rear end with a pin $u$. This pin passes through slots $v$, formed through opposite sides of the shaft $w$ of the capstan-head, and its ends project into an annular recess or counterbore $u'$, formed in the rear end of the sleeve-cam F, hereinafter described, and bear against the inner end of such recess. The capstan-head is moved forward against the force of the spring $t$ and is automatically returned by the reaction of the spring. The slots $v$ are to allow of the endwise movement of the spindle. An annular groove $a'$ is formed within the rear portion of the capstan-head, leaving a space between the shaft or spindle and such portion of the head. A rotating sleeve-cam F is formed with a forward portion, which enters within the annular groove $a'$ of the head. This cam is constantly rotated in the same direction by means of the wheel $b'$, which is fixed around the hinder end thereof. The forward edge of this cam forms the operating or cam face thereof, and the shape of such portion of the cam is shown by Fig. 6 as it would appear when developed. The cam rotates in the direction indicated by the arrow, Fig. 6. An antifriction-roller $c'$ is carried around a pin $s'$, which passes through the annular groove $a'$, and is securely fixed so as to turn with the capstan-head, and this roller is always pressed by the spring $t$ against the operative surface of the cam F. The inclination of the portion $d'$ of the surface of the cam is such that if the capstan-head is free to revolve—that is to say, is not held from turning by the locking-pin $c$—the cam in revolving will carry around with it the capstan-head; but if the capstan-head is locked from turning the pressure of the inclined surface $d'$ against the roller $c'$ will have the effect of forcing forward the head, and the roller will then pass from the surface $d'$ onto the long incline $f'$, thence onto the short length of surface $e'$ of the cam, which is parallel with the direction of rotation, and then will run down the abruptly-inclined surface $h'$ as the capstan-head is moved back again by the spring $t$. Obviously the stud-roller $c'$ forms a part of the turret-head, and any suitable projecting part of said head will serve for the cam to bear upon. The invention is not specifically limited in this respect. A special advantage of this arrangement of cam and roller for use in operating the capstan or turret head, besides the advantage it affords of enabling the number of tools carried by the head to be varied without unnecessary movements having to be performed by the head, is that the need is obviated for such minute accuracy as has to be observed in the ordinary arrangement for the purpose as to the relations between the mechanism by which the revolution of the capstan or turret head is stopped and the mechanism which causes the turning movement of the head, and in addition there is not the same liability to get out of order and become inoperative as when the ordinary mechanism is used.

It will be obvious that the invention or parts thereof may be applied also to other automatic turning-machines, for shaping or shaping and cutting off lengths of metal, besides the special type of machine in connection with which, for the sake of convenience, the invention has been particularly described.

Having thus described my invention, I claim—

1. In an automatic turning-machine, a cam consisting of a main, or disk portion adapted to be fixed to the shaft, and provided with a plurality of separate operating-heads secured to said main portion, each of said heads having a bearing-face and a shank parallel with the cam-axis and mounted adjustably in the said main portion, whereby the several faces of the operating-heads may be set at different distances from a plane at right angles to the cam-axis, in combination with variable-speed mechanism, through which the speed of the machine is automatically varied by the cam, substantially as set forth.

2. In an automatic turning-machine, a rotating cam consisting of a disk provided with a plurality of operating-heads secured to the lateral face of said disk, each of said heads having a bearing-face, and at its back a screw-shank which passes through the disk and is furnished with a nut, whereby the said heads may be set at different distances from a plane at right angles to the cam-axis, in combination with variable-speed mechanism through which the speed of the machine is automatically varied, substantially as set forth.

3. In an automatic turning-machine, the combination with a cam-shaft B, of an adjustable cam A, thereon, said cam comprising a main disk fixed on the shaft, a plurality of screw-shanks $b$, set concentrically in said disk parallel with the cam-axis, heads $a$, on said shanks, the intermediate lever $f'$, having a roller $l'$, to impinge upon the heads $a$, the slide $m'$, engaged by the upper end of said lever, and the disks $n'$ of the speed-varying mechanism, carried by said slide, substantially as set forth.

4. In an automatic turning-machine, a capstan or turret head having a plurality of locking-recesses, a movable locking-pin for engagement with either of said recesses, a cam which holds said pin out of engagement, and means for continuously rotating said head when unlocked, substantially as set forth.

5. In an automatic turning-machine, a capstan or turret head having a plurality of locking-recesses, a movable locking-pin for engagement with either of said recesses, a cam which holds said pin out of engagement, means for continuously rotating said head when unlocked, and means for varying the speed of said cam relatively to that of the turret-head, substantially as set forth.

6. In an automatic turning-machine, means for varying the number of stops of the turret during each of its rotations, said means comprising a locking mechanism whereby the rotatory movement of the turret-head is intermittently arrested, a rotating shaft which operates said locking mechanism, and change-wheels between said rotating shaft and the axis of the turret.

7. In an automatic turning-machine, the combination with a rocking tool-carrier for sidewise cutting, of a striker mounted on said carrier and having behind it a cushion-spring, the said spring, and a rotating cam adapted to impinge upon the striker, and acting through it and its cushion-spring, to rock the tool-carrier, substantially as set forth.

8. In an automatic turning-machine, a rocking arm, for use in sidewise cutting, formed with a bearing-face for a tool holder or holders which constitutes a portion of a cylindrical surface concentric with the axis about which the arm turns, and a tool-holder having a bearing-face which forms a portion of an interior cylindrical surface, and means for adjustably fixing the holder upon the portion of the surface of the arm which constitutes a portion of a cylinder, in a manner which allows it to be adjusted in position circumferentially thereof, substantially as described.

9. In an automatic turning-machine, the combination with the rocking piece D, provided with a tool-holder $k$, mounted adjustably thereon, with an arm $q$, with a cushioned striker $o$, mounted in the said arm, with a spring S, and with an adjustable stop-pin $r$, of the rotating disk G, provided with a cam $n$, adapted to act on the striker $o$ and rock the piece D, and a fixed part for the stop-pin to impinge upon, substantially as set forth.

10. In an automatic turning-machine, the combination with the capstan or turret head, of means for intermittently arresting the rotary motion of said head, a cam which rotates concentrically with said head, a stud on the said head, and means which keep said stud pressed forcibly but yieldingly up to the operative face of said cam, whereby when said turret-head is free to rotate it will be carried around by said cam, and when held against rotation, it will be moved forward by the cam, substantially as set forth.

11. In an automatic turning-machine, the combination with the capstan or turret head adapted for rotation and for endwise movement, of means for intermittently locking said head against rotary movement, a cam which rotates concentrically with said head, a stud on said head, and means which keep said stud pressed up forcibly but yieldingly against the face of said cam, the inclination of the face of said cam being too steep to overcome the yielding pressure of said stud when the head is free to rotate, substantially as and for the purposes set forth.

12. In an automatic turning-machine, the combination with means for varying the number of stops of the turret-head during each of its rotations, with change-wheels situated between the axis of said head and the axis of the shaft which controls those movements of the turning-machine which are required to be synchronous with the rotary movement of said turret-head, and with said controlling-shaft, of a cam which rotates concentrically with said head, a stud on the said head and means which keep said stud pressed forcibly but yieldingly up to the operative face of said cam, whereby when said head is free to rotate it will be carried around by said cam, and, when held against rotation, it will be moved forward by the cam, substantially as described.

13. In an automatic turning-machine, the combination with the cam-shaft B, the adjustable cam A thereon, the capstan-head, the sleeve-cam F, the wheel $b'$ thereon, the roller $b^2$, which drives the wheel $b'$, and the driving-roller $a^2$, alined axially with the roller $b^2$, of the slide $m^\times$, the lever $f'$, having one arm coupled operatively to the slide $m^\times$ and the other arm adapted to be operated by the cam A, the arms $m^3$, $m^3$, pivotally attached to the slide $m^\times$, the disks $n'$, $n'$, rotatively mounted on the respective arms $m^3$, and embracing the rollers $a^2$ and $b^2$, and elastic means connecting the upper ends of the said arms $m^3$, substantially as set forth.

In witness whereof I have hereunto signed my name, this 2d day of September, 1898, in the presence of two subscribing witnesses.

HERBERT AUSTIN.

Witnesses:
CHARLES ERNEST BAXTER,
ROBERT GEORGE GROVES.